(12) United States Patent
Kakishima et al.

(10) Patent No.: US 10,840,990 B2
(45) Date of Patent: Nov. 17, 2020

(54) RADIO COMMUNICATION SYSTEM, RADIO BASE STATION, AND USER EQUIPMENT

(71) Applicant: NTT DOCOMO, INC., Tokyo (JP)

(72) Inventors: Yuichi Kakishima, Tokyo (JP); Shinpei Yasukawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/773,308

(22) PCT Filed: Nov. 4, 2016

(86) PCT No.: PCT/US2016/060511
§ 371 (c)(1),
(2) Date: May 3, 2018

(87) PCT Pub. No.: WO2017/079544
PCT Pub. Date: May 11, 2017

(65) Prior Publication Data
US 2018/0331747 A1 Nov. 15, 2018

Related U.S. Application Data

(60) Provisional application No. 62/251,198, filed on Nov. 5, 2015.

(51) Int. Cl.
*H04B 7/02* (2018.01)
*H04B 7/06* (2006.01)

(52) U.S. Cl.
CPC ......... *H04B 7/0695* (2013.01); *H04B 7/0626* (2013.01); *H04B 7/0639* (2013.01)

(58) Field of Classification Search
CPC ... H04B 7/0695; H04B 7/0626; H04B 7/0639
See application file for complete search history.

(56) References Cited

U.S. PATENT DOCUMENTS

2004/0125773 A1 7/2004 Wilson et al.
2013/0301454 A1* 11/2013 Seol .................. H04B 7/043
370/252

(Continued)

FOREIGN PATENT DOCUMENTS

CN 104303477 A 1/2015
EP 2 882 110 A1 6/2015

(Continued)

OTHER PUBLICATIONS

International Search Report issued in PCT/US2016/060511 dated Mar. 13, 2017 (3 pages).

(Continued)

*Primary Examiner* — Dhaval V Patel
(74) *Attorney, Agent, or Firm* — Osha Bergman Watanabe & Burton LLP

(57) ABSTRACT

A radio communication system of an example includes: a first radio base station which includes an antenna including antenna elements, and configured to transmit signals from the antenna elements; and user equipment. The user equipment selects a desired signal for the user equipment by taking into account reception characteristics of the respective signals transmitted by the radio base station, and transmits a signal selection indicator to the radio base station. Based on the signal selection indicator, the radio base station determines an antenna element to transmit a signal for communications with the user equipment, and transmits a data signal precoded using a predetermined precoding vector to the user equipment.

4 Claims, 7 Drawing Sheets

(56) References Cited

U.S. PATENT DOCUMENTS

| | | | |
|---|---|---|---|
| 2014/0010126 A1* | 1/2014 | Sayana | H04J 3/1694 370/280 |
| 2014/0036796 A1 | 2/2014 | Etemad et al. | |
| 2014/0161093 A1 | 6/2014 | Hoshino et al. | |
| 2014/0177744 A1 | 6/2014 | Krishnamurthy et al. | |
| 2016/0028448 A1* | 1/2016 | Park | H04B 7/26 375/267 |
| 2016/0029239 A1 | 1/2016 | Sadeghi et al. | |
| 2016/0241322 A1* | 8/2016 | Son | H04B 7/0617 |
| 2016/0269093 A1 | 9/2016 | Seol et al. | |
| 2016/0301505 A1* | 10/2016 | Furuskog | H04B 7/0452 |

FOREIGN PATENT DOCUMENTS

| | | |
|---|---|---|
| JP | 2014502064 A | 1/2014 |
| JP | 2015185956 A | 10/2015 |
| WO | 2014165510 A1 | 10/2014 |
| WO | 20150016583 A1 | 2/2015 |

OTHER PUBLICATIONS

Written Opinion of the International Searching Authority issued in PCT/US2016/060511 dated Mar. 13, 2017 (8 pages).
Extended European Search Report issued in Application No. 16863035.8, dated Apr. 5, 2019 (14 pages).
Office Action issued in Japanese Application No. 2018-522734; dated Jul. 30, 2019 (10 pages).
Office Action in counterpart European Application No. 16863035.8, dated Feb. 10, 2020 (5 pages).
Office Action issued in Chinese Application No. 201680076652.0; dated Aug. 28, 2020 (16 pages).
Office Action issued in European Application No. 16863035.8; dated Sep. 23, 2020 (5 pages).

* cited by examiner

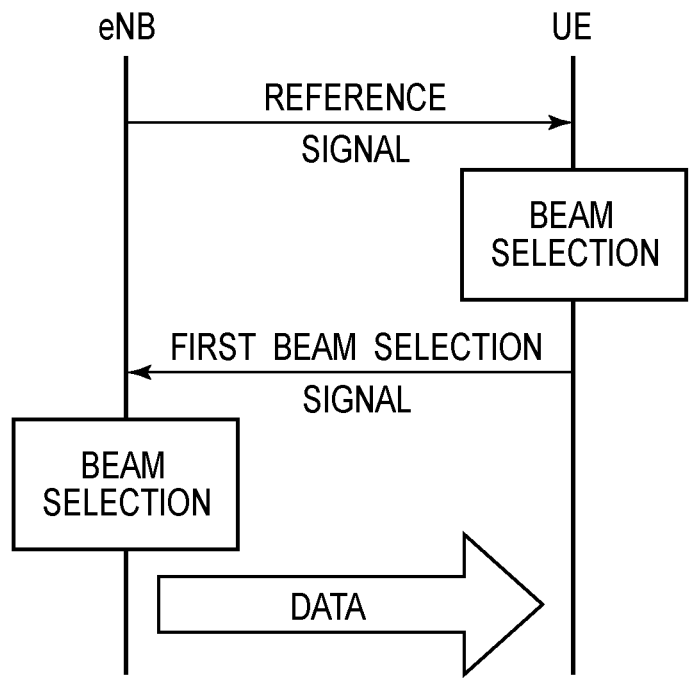
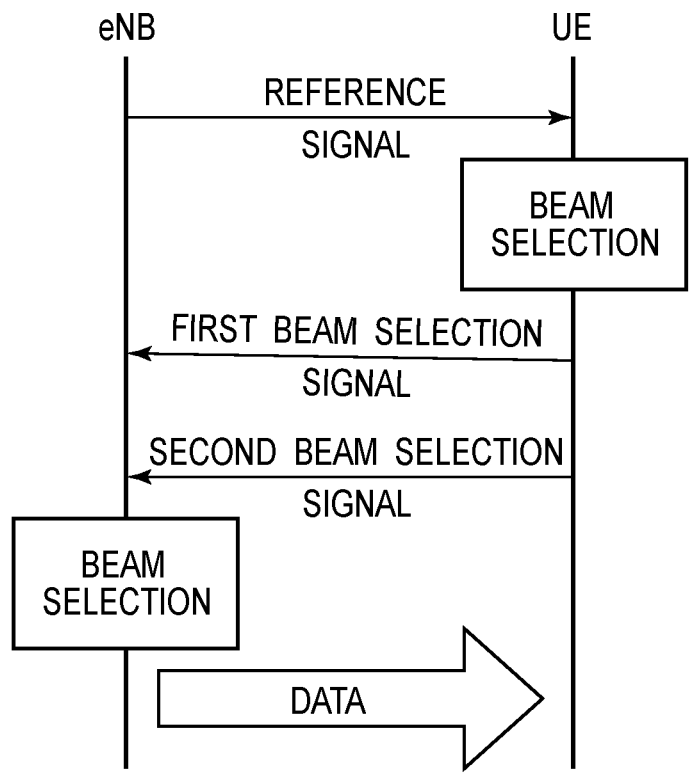

RADIO COMMUNICATION SYSTEM, RADIO BASE STATION, AND USER EQUIPMENT

CROSS REFERENCE TO RELATED APPLICATIONS

This application claims priority to U.S. provisional Patent Application Ser. No. 62/251,198 filed on Nov. 5, 2015, entitled "WIRELESS COMMUNICATION SYSTEM, WIRELESS BASE STATION DEVICE, AND USER EQUIPMENT", the entire contents of which are incorporated herein by reference.

FIELD OF THE INVENTION

The present disclosure relates to a radio communication technology, and particularly relates to a radio communication system, a radio base station, and user equipment that use multiple input multiple output (MIMO) techniques.

BACKGROUND

The long term evolution (LTE) standards specifications of the Third Generation Partnership Project (3GPP) (hereinafter referred to as the "standard specifications"), and in particular, Releases 8 to 11, have adopted techniques including a technique for performing horizontal beamforming with antenna elements arrayed in the transverse direction in a radio base station or evolved Node-B (eNB).

In Release 13 standardization of the standard specifications, studies are in progress related to three-dimensional MIMO (3D-MIMO) in which the eNB is equipped with a number of antenna elements arrayed two-dimensionally, e.g., in the vertical and transverse directions. The arrayed antenna elements may form beams in the vertical direction in addition to forming beams in the horizontal direction. The formation of beams in the vertical direction (elevation/declination-angle direction) and the horizontal direction (azimuth direction) is expected to improve the system characteristics.

According to the 3GPP standardization terminology, 3D-MIMO with 8 or less transmission antennas is referred to as elevation beamforming. 3D-MIMO with more than 8 (16, 32, 64, or more) transmission antennas is referred to as full dimension MIMO (FD-MIMO). FD-MIMO is often referred to as Massive MIMO.

Massive MIMO can improve frequency utilization efficiency by forming sharp beams using a great number of eNB antenna elements. Massive MIMO improves spatial separation performance in transmission beamforming. Accordingly, Massive MIMO is expected to enhance the effect of the application of multi-user MIMO (MU-MIMO).

Systems implemented according to the LTE standard specifications are based on SU-MIMO-based CSI feedback. Accordingly, such systems cannot perform appropriate UE pairing, or CSI estimation with inter-user interference (Iu) taken into account. Meanwhile, in Massive MIMO systems or implementations, achieving a reduction in the flash light effect caused by inter-cell interference (Ic) is important from the viewpoint of improving communication quality.

FIG. 1 is a diagram that illustrates inter-user interference and inter-cell interference. While user equipment (UE) 30 is receiving signal S from the eNB 20A, signals from the eNB 20A to other UEs work as interference signals impeding the reception of signal S in UE 30. The interference experienced in UE 30 from signals provided to other UEs by the eNB 20A is called inter-user interference (Iu). On the other hand, while UE 30 is receiving signal S from the eNB 20A, a signal from the eNB 20B works as an interference signal. The interference between the eNB 20A and the eNB 20B is called the inter-cell interference (Ic).

Meanwhile, it is known that a UE in a MIMO system can obtain large system gain by appropriately controlling a beam used for data transmission to the UE itself, a beam used for data addressed to another simultaneously served user (UE(s)) for multi-user (MU) MIMO pair), and a beam used in another cell.

However, an increase in the number of antennas narrows the widths of transmission beams, and increases the number of precoder candidates. In this case, overhead of transmission beam control increases according to an increase in the amount of feedback information needed for precoder selection.

BRIEF DESCRIPTION OF DRAWINGS

FIG. 4 is a diagram illustrating a sequence chart of a communication system in accordance with one or more embodiments.

FIG. 5 is a diagram illustrating a sequence chart of a communication system in accordance with one or more embodiments.

DETAILED DESCRIPTIONS

Figure 1:
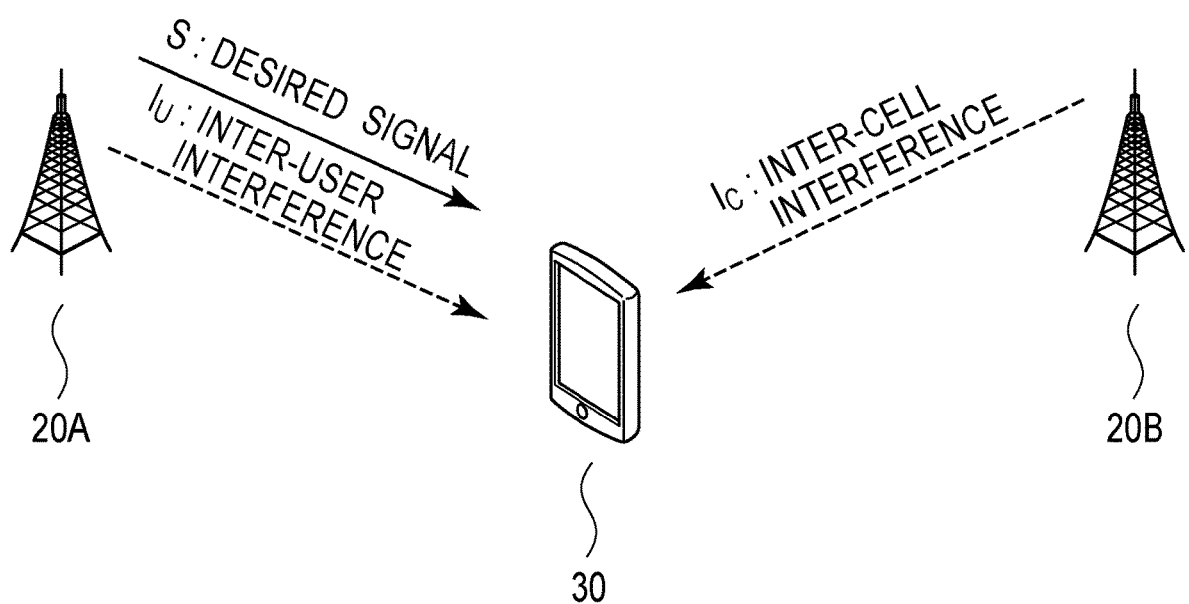
FIG. 1 is a diagram illustrating inter-user interference and inter-cell interference.

Referring to the drawings, descriptions are hereinbelow provided for an embodiment. The same or similar components illustrated in the drawings are denoted by the same or similar reference signals. Duplicated descriptions are basically omitted. All the drawings are schematic, and things such as dimensional ratios among components in the drawings do not limit the interpretation of one or more embodiments. For this reason, specific dimensions and the like shall be determined with the following descriptions taken into consideration. It is a matter of course that the drawings include components whose dimensional relationships and ratios are different from one to another.

One or more embodiments achieve reference signal or transmission beam control in a MIMO system using beams with lower feedback overhead.

Figure 2:
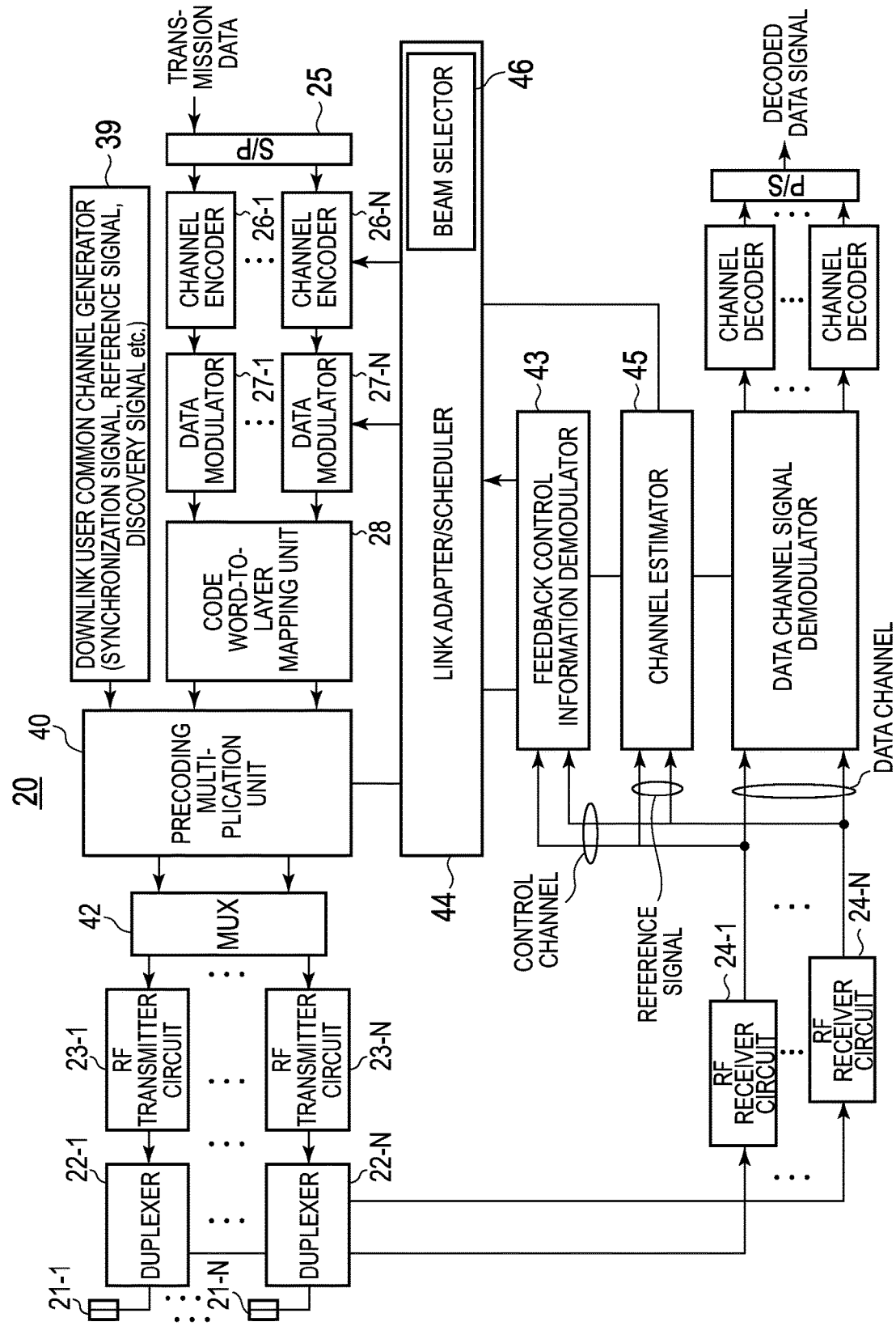
FIG. 2 is a block diagram illustrating base station or evolved Node-B (eNB) suitable for use in accordance with one or more embodiments.

FIG. 2 is a block diagram of eNB 20 of one or more embodiment. The eNB 20 includes: antennas 21-1 to 21-N; a number of radio frequency (RF) transmitter circuits 23-1 to 23-N corresponding to the number of antennas; and a number of radio frequency (RF) receiver circuits 24-1 to 24-N corresponding to the number of antennas. The antennas 21-1 to 21-N may be arrayed in a two-dimensional shape or configuration. However, the antennas 21-1 to 21-N may alternatively or additionally be arrayed in a one-dimensional or three-dimensional shape or configuration. Downlink user common channel generator 39 generates a downlink user common signal to be transmitted to all the users located within the cell of the eNB 20. The downlink user common signal included a synchronization signal, a reference signal and a discovery signal. Based on a feedback signal transmitted from a user equipment (UE), such as the UE 30, link adapter/scheduler 44 performs link adaption, and a scheduling process on the UE. In this respect, link adapter/scheduler 44 of one or more embodiments includes beam selector 46. Based on a beam selection signal from the UE, beam selector 46 may be configured to select a beam to be used for communications with the UE. Descriptions are later provided for an algorithm for beam selector 46.

Precoding multiplication unit 40 linearly processes a signal sequence of the downlink user common signal by switching precoding vectors generated by link adapter/scheduler 44 based on times, frequencies, and antenna groups. RF transmitter circuits 23-1 to 23-N convert the linearly processed downlink user common signal into a high-frequency signal. The resultant high-frequency signal passes through duplexers 22-1 to 22-N, and is transmitted from antennas 21-1 to 21-N in a desired beam shape, and in a desired direction.

RF receiver circuits 24-1 to 24-N receive an uplink signal, received by antennas 21-1 to 21-N, via duplexers 22-1 to 22-N. In a condition in which the received signal represents feedback control information on things such as a result of a selection by the UE 30 of a precoding vector (a beam number, reference signal number, or the like), the feedback control information is supplied to channel estimator 45 and feedback control information demodulator 43. A result of the demodulation is inputted into link adapter/scheduler 44. Precoding multiplication unit 40 precodes data to be transmitted to the UE 30 according to the selected beam (precoding vector).

In a condition in which the received signal is an uplink reference signal from UE 30, a downlink channel may be estimated based on the received signal and a channel duality characteristic, for example. Alternatively or additionally, an incoming direction may be estimated from the received signal so that a result of the estimation is supplied to link adapter/scheduler 44. Depending on the estimated incoming direction, link adapter/scheduler 44 selects a downlink precoding vector.

A transmission data signal is processed by serial-parallel converter 25, channel encoders 26-1 to 26-N, data modulators 27-1 to 27-N and code word-to-layer mapping unit 28. Thereafter, precoding multiplication unit 40 appropriately precodes the resultant transmission data signal. In a condition in which the reference signal is transmitted while distributed in the data signal, multiplexer 42 multiplexes the precoded reference signal and data signal, and transmits the resultant signals from antennas 21-1 to 21-N in a beam shape.

It should be noted that illustrations and descriptions for a reception timing estimation process, a CP (Cyclic Prefix) removal process, an FFT process and an IDFT process for the reception sequence, as well as an IFFT process, a CP adding process and the like for the transmission sequence are omitted.

Figure 3:
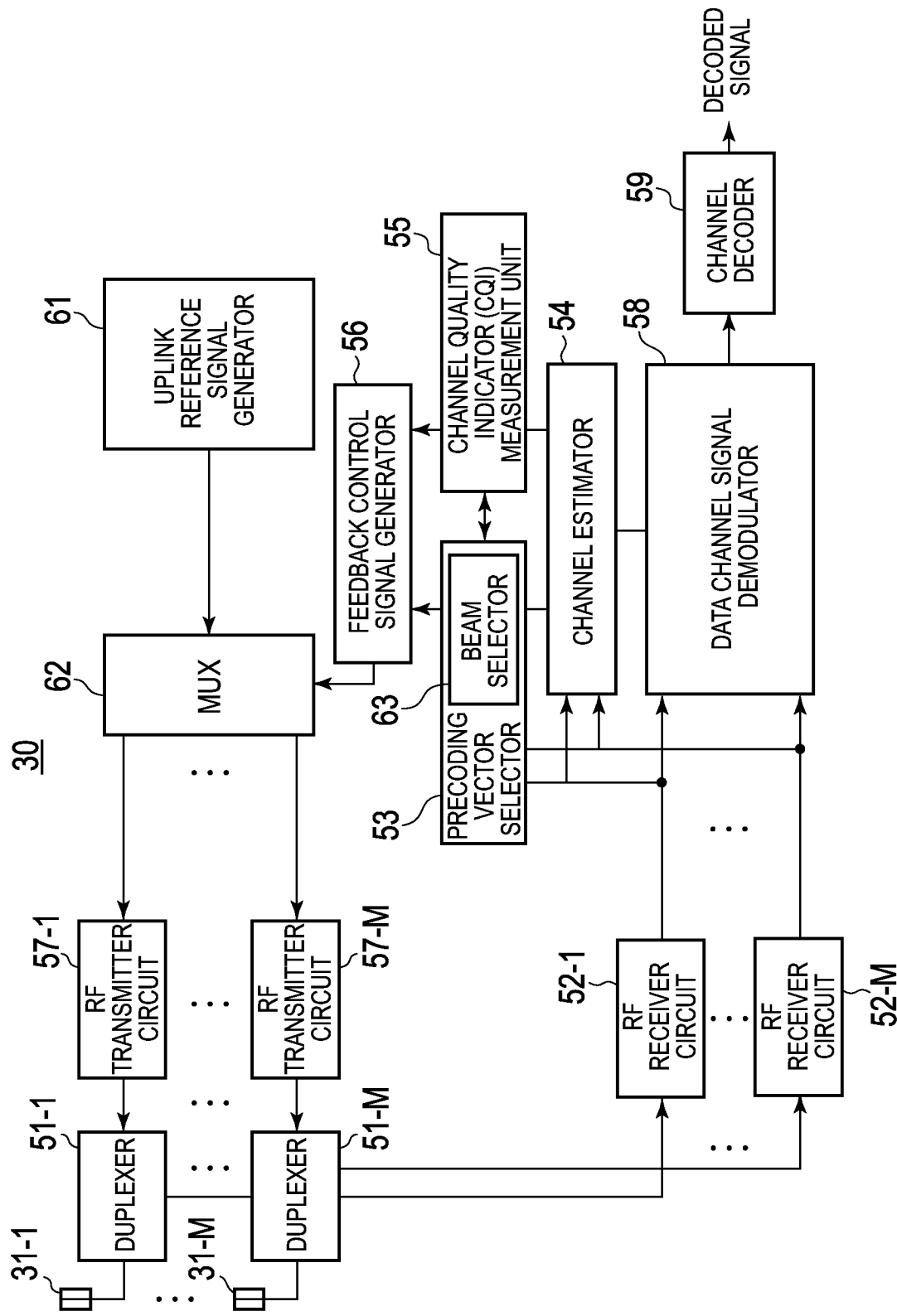
FIG. 3 is a configuration diagram illustrating a UE suitable for use in accordance with one or more embodiments.

FIG. 3 is a block diagram of the UE 30 of one or more embodiments. Radio frequency (RF) receiver circuits 52-1 to 52-M receive the downlink user common signal via antennas 31-1 to 31-M and duplexers 51-1 to 51-M.

In this respect, precoding vector selector 53 of one or more embodiments includes beam selector 63. Descriptions are later provided for a process algorithm for beam selector 63.

Feedback control signal generator 56 generates feedback control information for feeding back a precoding vector (a precoding matrix number and a beam number) selected by precoding vector selector 53. After passing through RF transmitter circuits 57-1 to 57-M and duplexers 51-1 to 51M, the feedback control information is transmitted from antennas 31-1 to 31-M to eNB 20.

Uplink reference signal generator 61 generates a reference signal, a physical random access channel (PRACH) or the like which are transmitted to eNB 20 when an initial connection to eNB 20 is established. Multiplexer 62 may multiplex the reference signal and an uplink shared channel (PUSCH) (not illustrated).

RF receiver circuits 52-1 to 52-M receive a downlink data signal from eNB 20. This data signal is precoded and transmitted based on the feedback control signal or the uplink reference signal. Based on a result of channel estimator 54's channel estimation, data channel signal demodulator 58 demodulates the data signal, and channel decoder 59 decodes the resultant data signal.

FIG. 4 is a first sequence chart of a communication system of one or more embodiments. The eNB transmits a downlink reference signal using the antenna array, for example. The reference signal may or may not be subjected to beamforming, and may be singular or plural. After receiving the downlink reference signal, the UE selects an appropriate beam control process based on the received reference signal. The UE transmits a result of the selection, as a first beam selection signal, to the eNB. Upon receipt of the first beam selection signal from the UE, the eNB identifies a beam to be used for the UE based on the first beam selection signal, as well as transmits and receives data to and from the UE using the identified beam.

FIG. 5 is a second sequence chart of the communication system of one or more embodiments. The eNB transmits a downlink reference signal using the antenna array, for example. The reference signal may or may not be subjected to beamforming, and may be singular or plural. After receiving the downlink reference signal, the UE selects an appropriate beam control process based on the received reference signal. The UE transmits a result of the selection, as a first beam selection signal, to the eNB. According to the second sequence chart, in this respect, the UE transmits a second beam selection signal to the eNB in addition to the first beam selection signal. In this case, the UE may transmit the first and second signals in succession, or may transmit the second signal at a certain interval after transmitting the first signal. Alternatively or additionally, the UE may transmit the downlink reference signal between the first and second signals. Upon receipt of the first beam selection signal from the UE, the eNB identifies a beam to be used for the UE based on the first beam selection signal, as well as transmits and receives data to and from the UE using the identified beam.

Figure 6:
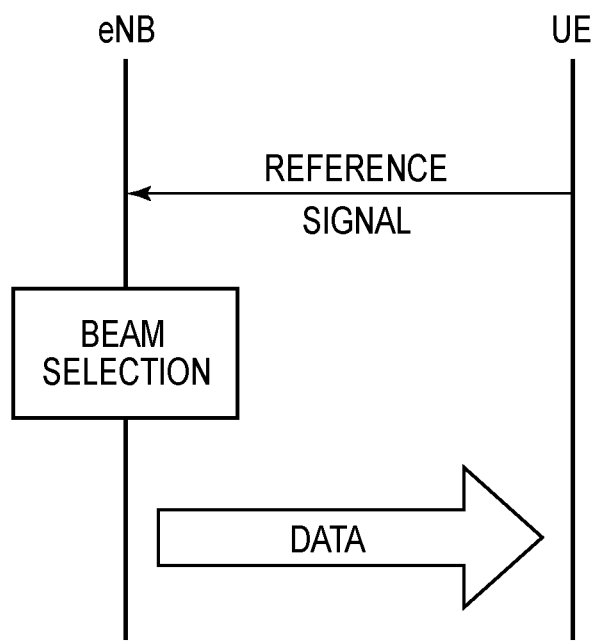
FIG. 6 is a diagram illustrating a sequence chart of a communication system of the in accordance with one or more embodiment.

FIG. 6 is a third sequence chart of the communication system of one or more embodiments. In accordance with one or more embodiments a description of how beam selection using the channel duality characteristic is performed may be useful. First of all, the EU transmits the reference signal to the eNB. Upon receipt of the reference signal from the UE, the eNB identifies a beam to be used for the UE based on the reference signal, as well as transmits and receives data to and from the UE using the identified beam. FIGS. 4 to 6 illustrate examples of how to determine the precoder. These examples may be combined together. For instance, as illustrated in FIG. 4, the precoder may be determined based on feedback after the beam selection using the channel duality characteristic illustrated in FIG. 6.

Figure 7:
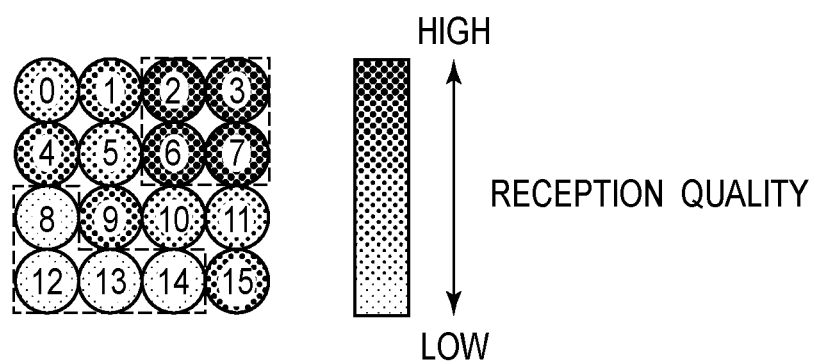
FIG. 7 is a schematic diagram illustrating a two-dimensional antenna array included in an eNB.

FIG. 7 illustrates 16 candidates for the two dimensional beam which eNB 20 is capable of transmitting. One or more embodiments include the beam candidates which are arrayed in a 4×4 matrix. Nevertheless, one or more embodiments are not limited to such an example or examples. The beam array may be different, such as a closest packed array. The beam candidates do not have to be finite (discrete). For the sake of explanatory convenience, the beams transmittable from the eNB 20 are denoted by reference numerals 1 to 15. In FIG. 7, types of hatching represent how high or low the reception characteristic is. In FIG. 7, it is assumed that: a group with the highest reception characteristics includes beams 2, 3, 6, 7; and beam 6 has the highest reception characteristic among these beams. Furthermore, it is assumed that: a group with the second highest reception characteristics includes beams 1, 4, 9, 15; a group with the third highest reception characteristics includes beams 0, 5, 10, 12; and a group with the lowest reception characteristics includes beams 8, 12, 13, 14. It is assumed that beam 12 had the lowest reception characteristic among these beams. In this respect, the beams belonging to the same reception characteristic groups do not necessarily have to have the same reception strength.

Next, descriptions are provided for a method of determining the precoder based on the beam selection. To begin with, descriptions are provided for an algorithm for beam selector 63 of the UE 30 to tell eNB 20 which beam is desired for communications with the UE 30. In this example, the UE 30 may transmit the first beam selection signal using an index representing a beam which achieves the highest reception characteristic among Beamformed CSI-RSs. To this end, the UE 30 may transmit the first beam selection signal using a beam number. For example, when the reception condition is as illustrated in FIG. 7, the UE transmits Beam Number 6 to the eNB. This case requires 4 bits, since there are 16 selectable beam candidates. Alternatively or additionally, the UE 30 may transmit the beam numbers representing multiple (which may be 2, 3, 4, 5, 6 and the like arbitrarily selected, for example) beams which achieve the highest reception characteristics among the Beamformed CSI-RSs. For example, the UE 30 may transmit the first beam selection information using beam numbers, such as Beam Numbers 2, 3, 6, 7 corresponding to antenna elements. This case requires 16 bits, since the four beam numbers are transmitted from those representing the 16 selectable beam candidates. Alternatively or additionally, a method may be employed in which the UE 30 transmit the first beam selection information using a predetermined number (which may be 2, 3, 4, 5, 6 and the like arbitrarily determined, for example) of indices representing beams which are selected in descending order of the reception characteristic, such as using Beam Numbers 6, 2, 7, 3. Alternatively or additionally, the UE 30 may transmit the first beam selection information using a bitmap. For example, the UE 30 sends a bitmap [0011001100000000] in order to transmit Beam Numbers 2, 3, 6, 7. This case requires 16 bits since there are 16 selectable beam candidates. The use of the bitmap like this makes it possible to keep the number of CSI feedback bits regardless of how many beams are selected.

Meanwhile, in a condition in which there is another UE simultaneously connected to the same antenna array as is the UE 30 (hereinafter referred to as simultaneously served UE), the UE 30 may determine a beam desired for the other UE instead of telling the eNB which beam is desired for communications with the UE 30. In other words, this method is a method reverse to the method of selecting the beam desired for communication with the UE 30, and the UE 30 needs to transmit a beam which achieves a low beamforming gain for the purpose of reduction in the interference. In this case, the UE 30 may transmit the first beam selection signal using an index representing a beam which achieves the lowest reception characteristic among the Beamformed CSI-RSs. For example, when the reception condition is as illustrated in FIG. 7, the UE feeds back Beam Number 12 to the eNB. This case requires 4 bits, since there are 16 selectable beam candidates. Alternatively or additionally, the UE 30 may transmit beams which achieve the lowest reception characteristics among the Beamformed CSI-RSs. For example, the UE 30 may transmit the first beam selection information using beam numbers, such as Beam Numbers 8, 12, 13, 14. This case requires 16 bits, since the four beam numbers are transmitted from those representing the 16 selectable beam candidates.

Alternatively or additionally, a method may be employed in which the UE 30 transmits the first beam selection information using indices representing a predetermined number (which may be 2, 3, 4, 5, 6 and the like arbitrarily selected, for example) of beams which are selected in ascending order of the reception characteristic, such as using Beam Numbers 12, 13, 8, 14. Alternatively or additionally, the UE 30 may transmit the first beam selection information using a bitmap. For example, the UE 30 sends a bitmap [0000000010001110] in order to transmit Beam Numbers 8, 12, 13, 14. This case requires 16 bits since there are 16 selectable beam candidates. The use of the bitmap like this makes it possible to keep the number of CSI feedback bits regardless of how many beams are selected.

Next, descriptions are provided using the second sequence chart in FIG. 5. Descriptions are provided for a method of in which the UE 30 transmits the first beam selection information and the second beam selection information to the eNB. In this example, the UE 30 transmits the first beam selection information using an index representing a beam desired for communications with the UE, and the second beam selection information using a beam desired for the simultaneously served UE. To put it specifically, the UE may transmit an index representing a beam which achieves the highest reception characteristic among the Beamformed CSI-RSs, and an index representing a beam which achieves the lowest reception characteristic among the Beamformed CSI-RSs. For example, the UE 30 may transmit the first beam selection information and the second beam selection information using the beam number. For example, when the reception condition is as illustrated in FIG. 7, the UE 30 transmits the first beam selection information and the second beam selection information to the eNB using Beam Number 6 as the highest reception characteristic, and Beam Number 12 as the lowest reception characteristic, respectively. Sending the beam number (reference signal number, or the like) in the present example requires 8 bits, since there are 16 selectable beam candidates.

Alternatively or additionally, the UE may transmit a multiple number of beam numbers (which multiple number may be 2, 3, 4, 5, 6 beam numbers and the like, the multiple number of beam numbers being arbitrarily determined, for example) associated with beams that achieve the highest reception characteristics among the Beamformed CSI-RSs, and a multiple number of beam numbers (which multiple number may be 2, 3, 4, 5, 6 beam numbers and the like, the multiple number of beam numbers being arbitrarily determined, for example) for beams that achieve the lowest reception characteristics among the Beamformed CSI-RSs. As shown in FIG. 7, The beam numbers that achieve the highest reception quality may be indicated, such as by using Beam Numbers 2, 3, 6, 7, and the beam numbers that achieve the lowest reception quality may be indicated, such as by using Beam Numbers 8, 12, 13, 14 corresponding to antenna elements. The present example requires 32 bits, since a total of 8 beam numbers representing a set of four beam numbers associated with the first selection information and a set of four beam numbers associated with the second selection information are transmitted from among the 16 selectable beam candidates. Alternatively or additionally, a method may be employed in which the UE transmits the first beam selection information and the second beam selection information using indices representing a predetermined number (which may be 2, 3, 4, 5, 6 and the like arbitrarily determined, for example) of beams which are selected in descending or ascending order of the reception characteristic, such as a predetermined number of beams, such as 4 beams, with Beam Numbers 6, 2, 7, 3 representing the beams in ascending or descending order of reception characteristic. Alternatively or additionally, the UE may transmit the first and second beam selection information using bitmaps. For example, in order to transmit Beam Numbers 2, 3, 6, 7 and Beam Numbers 8, 12, 13, 14, for the first selection information and the second selection information, the UE may send bitmaps [0000000001100110] and [0011100010000000] (assuming right most bit is the 1-bit and the left most bit is the 16-bit). The present example requires a total of 32 bits since there are 16 selectable beam candidates for each set of information. The use of the bitmaps as in the present example, makes it possible to keep the number of CSI feedback bits regardless of how many beams are selected. In this respect, the recognition of a beam desired for the multiple users can be achieved by using the bitmap having a bit set that represents the desired beam.

In addition, the reception quality of each beam may be evaluated according to various levels using the beam selection signal. For example, in a condition in which two bits are given to each beam, the reception quality may be evaluated on 4 levels (from Level 0 to Level 3). To put it specifically, a level is represented for a reception quality on a per-beam basis, such as by performed using one beam selection signal (for example, the first beam selection signal) alone. The present example, which provides a selection of 16 beams (8 beams for first reception characteristic and 8 beams for second reception characteristic) requires 64 bits to represent reception quality of each beam.

Moreover, the information may be transmitted in a combination of above-discussed items. For example, a beam index (or reference signal index, or the like) representing a beam which achieves the highest reception characteristic, and a bitmap indicating beam indices representing beams which achieve lowest reception characteristics may be transmitted using a reference index or number and a bitmap. For example, a beam number representing a beam which achieves the highest reception characteristic (e.g., beam index 6), and beam numbers representing beams which achieve lowest reception characteristics (e.g., beam indices 2, 3, 4 and 8) may be transmitted using a reference number and a bitmap. To put it specifically, the amount of data can be reduced in the present example can be reduced by transmitting a reference number "6" and a bit map "[0000000010001110]" are transmitted. This case requires 4 bits to represent the number "6" and 16 bits for the bit map, resulting in 20 bits in total.

It should be noted that in these examples, feedback information on the high and low reception characteristics may be determined using the same Beamformed CSI-RS.

Although the foregoing descriptions are provided for the examples of the simultaneously served UE within one cell, these examples can be applied in order to reduce the inter-cell interference (Ic). For example, the UE 30, and/or one or more UEs, may be configured to receive Beamformed CSI-RSs from a neighboring cell and may feed back the reception qualities (reception strengths) of the Beamformed CSI-RSs back to the neighboring cell. For example, when one or more beams with higher reception strengths are transmitted, it is possible to identify which beam causes more interference. Furthermore, for example, when one or more beams with lower reception strengths are transmitted, it is possible to identify which beam causes less interference. Since the foregoing examples are applicable to one or more embodiments already described, detailed descriptions for them are omitted.

In this respect, when the terminal (e.g., a UE) selects one of beams for the terminal itself, the simultaneously served terminal and another cell, the terminal may transmit either of the "desired beam" and the "undesired beam," as described above. The beam selection may be performed using NZP (Non Zero Power) CSI-RSs, or using Zero Power (ZP) CSI-RSs (Interference Measurement Resource (IMR)). For example, beam selection may be made based on comparison of a multiple reception strengths of the interference signals. "desired beam" and/or "undesired beam" may be selected based on reception quality (e.g. reception power) in the Zero power resource. In the present example, ZP CSI-RS resource(s) for CSI or interference measurement can be configured and transmitted to the UE. The multiple ZP CSI-RSs may be grouped as a resource-grouping. For example, a part of ZP CSI-RS resource may be used for selecting desired beam. A part of ZP CSI-RS resource may be used for selecting beam addressed to another simultaneously served user (e.g., UE). A part of a ZP CSI-RS resource may be used for selecting beam from other cells. In this example, the grouping may be signaled in a higher layer and/or a lower layer. One of ordinary skill in the art will recognize that reference to "layer" may refer to a particular layer or layer in a layered protocol architecture (e.g., OSI 7-layer architecture) and that "lower" layer may refer, for example, to low layer in the architecture, such as a physical layer (PHY), layer 1, or the like, and that "higher" layers may refer to layers that are "above" the low layer, e.g. layers 2-7 (or possibly greater). The standard of the selection of the feedback information may be configured for each of the group. For example, an instruction to feed back the highest reception quality beam information in ZP CSI-RS for desired beam may be configured. As another example, an instruction to feed back the bad reception quality beam information may be included in a ZP CSI-RS message for providing information useful for determining inter-user interference. Moreover, although the foregoing and following examples are described by citing the BI (Beam Index)-based transmitting method, these examples may use a PMI (Preferred Matrix Index)-based transmitting method or other method. In addition, although the foregoing descriptions are provided for the examples using the Beamformed CSI-RSs, the examples may be performed using Non-precoded CSI-RSs, other uplink/downlink reference signals, or synchronization signals. Alternatively or additionally, the examples may be performed using a transmitting method based on cell selection information such as measurement report information and handover-related information. Alternatively or additionally, examples of the foregoing may be performed using information to be obtained by using the channel duality characteristic. For example, the PMI desired for the simultaneously served UE may be transmitted using a bitmap.

Figure 8:
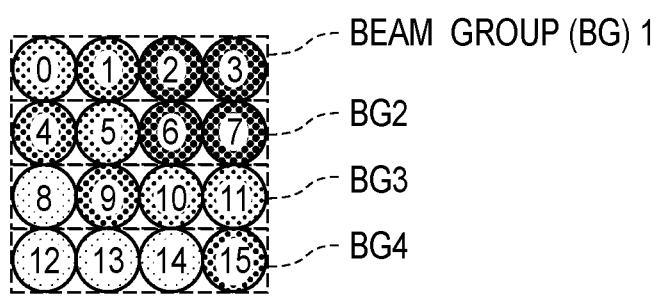
FIG. 8 is a diagram illustrating a first example in which beams or reference signals are divided into groups.

FIG. 8 is a diagram illustrating a first example in which the beams, reference signals, or the like, are divided into groups. The configuration may be made such that: the beams are divided into groups; and an index representing a beam group is transmitted. As illustrated in FIG. 8, Beam Numbers 0 to 3 are classified as belonging to Beam Group 1 ("BG1"); Beam Numbers 4 to 7 are classified as belonging to Beam Group 2 ("BG2"); Beam Numbers 8 to 11 are classified as belonging to Beam Group 3 ("BG3"); and Beam Numbers 12 to 15 are classified as belonging to Beam Group 4 ("BG4"). This grouping makes it possible to do things such as a reduction in an amount of feedback information. In the first example, the grouping is based on rows. However, the grouping is not limited to this case. For example, the grouping may be based on columns.

Figure 9:
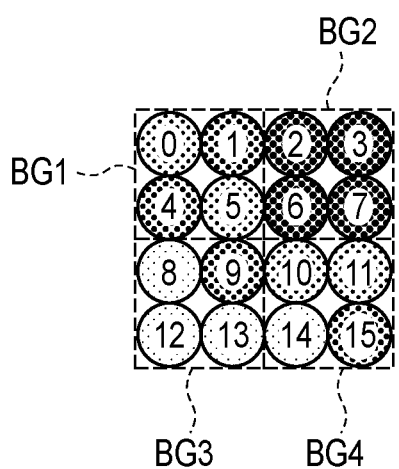
FIG. 9 is a diagram illustrating a second example in which beams or reference signals are divided into groups.

FIG. 9 is a diagram illustrating a second example in which the beams are divided into groups. In the second example, the beams are divided into four groups: an upper left group, an upper right group, a lower left group and a lower right group. As illustrated in FIG. 9, Beam Numbers 0, 1, 4, 5 are classified as belonging to Beam Group 1 ("BG1"); Beam Numbers 2, 3, 6, 7 are classified as belonging to Beam Group 2 ("BG2"); Beam Numbers 8, 9, 12, 13 are classified as belonging to Beam Group 3 ("BG3"); and Beam Numbers 10, 11, 14, 15 are classified as belonging to Beam Group 4 ("BG4"). This grouping makes it possible to do things such as a reduction in an amount of feedback information.

In the examples illustrated in FIGS. 8 and 9, the beams are divided into four groups. The grouping is not limited to this case. The beams may be divided into 2, 3, 4, 5, 6 or more groups with the number of antenna elements taken into account.

In the condition in which the beams are divided into the beam groups, the UE needs to know how the beams are associated with the beam groups. The association may be determined in advance to be implicitly used without transmitting. Furthermore, each group may include consecutive beam indices. Alternatively or additionally, the eNB may explicitly transmit the association to the UE. For example, the eNB may transmit the number of beams belonging to each beam group. For example, when the eNB tells the UE that the number of beams belonging to each beam group is four, the UE selects one group from the four groups. Alternatively or additionally, the eNB may transmit a total number of beam groups. Alternatively or additionally, for each beam, the eNB may transmit a group index. Alternatively or additionally, for each group, the eNB may transmit beam indices. For example, the eNB may transmit the association using MIB (Master Information Block), SIB (System Information Block), RRC (Radio Resource Control) or DCI (Downlink Control Information).

The CSI transmitted by the UE may be fed back based on information of beam group. For instance, the fed-back information may include that the number of selectable beam in the group are restricted. In this case, the number of selectable beam may be a fixed such as, 1, 2, 3, or 4, depending of the configuration of the antenna. Moreover, the UE may transmit the number of selectable beam by MIB, SIB, RRC, MAC, CE, or DCI.

Furthermore, the information transmitted by the UE may be information concerning the above-discussed beam selection, or may include accompanying CSIs in the information. For example, the UE may transmit the beam indices and feed CSIs concerning the beam indices back to the eNB. The UE may feedback the CSIs as differentials (for example, Differential CQIs). The beams may be specified as mutually-different CSI-RS configurations.

Moreover, eNB may specify if CSI is transmitted at higher or lower layer signaling. As an example, eNB may transmit CSI for desired beam but not transmit CSI for inter-user interference, and inter-cell interference. Alternatively or additionally, the beams may be specified as mutually-different APs (or the beams may be respectively applied to mutually-different APs). Alternatively or additionally, the beams may be specified using a different method.

One or more embodiments described above regard a desired beam, a beam used for the simultaneously served user, and a beam used in another cell. An eNB may instruct a UE which information UE feeds back to eNB. In the present example, an eNB may utilize signaling only at higher layer, signaling only at lower layer, signaling both higher and lower layers. As discussed above "layer" may refer to a particular layer or layer in a layered protocol architecture, and a relative position of the layer.

The information that an eNB instructs a UE to feed back may include the beam quality of one or more beams or reference signals received by the UE. For example, the feedback may include information regarding good reception quality of one or more beams or reference signals, information regarding bad reception quality of one or more beams or reference signals, or a combination thereof. An eNB may instruct a UE associated with a group in which group UE measurements are made to provide feedback in a condition in which multiple zero-power (ZP) CSI-RS resource groups are configured. The term resource group includes desired beam, simultaneously served user, and another cell.

Next, descriptions are provided for the number of beams or reference signals transmitted by the UE. While the term "beam" is used herein, in the following description, it will be understood by one of skill in the art that the term "beams" may also refer more generally to reference signals, or the like. In some embodiments, the number of thus-transmitted beams may be a fixed number. Alternatively or additionally, the eNB may specify and transmit the number of beams to be used by the UE using MIB, SIB, RRC, MAC CE, and/or DCI mechanisms.

Alternatively or additionally, the UE may be configured to transmit beams based on a reception quality threshold value. For example, the UE may be configured to detect the reception qualities of the received beams, and to transmit beams which achieve a gain greater than a certain threshold value. To put it specifically, a UE and/or system may be configured such that in a condition in which the UE receives beams which achieve a gain equal to or greater than a threshold value of certain decibels (dB), the UE transmits all or some of such beams. Alternatively or additionally, the UE may be configured to transmit beams based on noise levels. For example, a UE and/or system may be configured such that when receiving beams, the UE may transmit all or some of the beams having noise levels that exceed a certain threshold value.

In addition, beams or reference signals to be transmitted may be determined based on a threshold value range from the strongest beam or the weakest beam. For example, the UE may transmit all of beams in a 20 dB range from the strongest beam. In addition, the number of beams desired for the UE may be different from the number of beams desired for the simultaneously served user.

Moreover, the UE may perform the transmitting through a broad band, or through a narrow band. For example, the UE may transmit signal components of the UE through the broad band, and interference components through the narrow band. In addition, the UE may transmit beams selected by the UE for each subframe set.

Next, descriptions are provided for the definition of the reception characteristic. The reception characteristic may be defined as a quality related, strength related, characteristic, or the like of signals that are received. Here, the reception characteristic may be defined as RSRP (Reference Signal Received Power), RSRQ (Reference Signal Received Quality), RSSI (Received Signal Strength Indicator), or CSI-RSRP (Channel State Information-Reference Signal Received Power). Alternatively or additionally, a measurement result of RRM (Radio Resource Measurement) may be used as the reception characteristic. Alternatively or additionally, the reception characteristic may be determined based on a result of channel estimation of Beamformed CSI-RSs, Non-precoded CSI-RSs, other reference signals, or synchronization signal. For example, the reception characteristic may be determined based on channel quality information, such as BI (Beam Index), RI (Rank Indicator), PMI (Precoding Matrix Indictor) or CQI (Channel Quality Indicator), which is calculated based on the CSI-RSs.

In this respect, for example, although the UE can determine the precoder for any of the UE, the simultaneously served user, and the neighboring cell based on the foregoing example, the UE cannot know the CSI (for instance, the CQI) of the actual signal or beam to which the precoder is applied.

Incidentally, the technique described below is not necessarily limited to that to which the foregoing technique is applied. For example, the precoder may be determined based on the channel duality, or based on PMI-based feedback information.

Next, descriptions are provided for an example in which CSI is estimated with both or either of the inter-user interference and the inter-cell interference taken into account. The precondition is that in FIG. 1, Beam Number 6 is selected as a desired signal from eNB 20A, and Beam Number 12 is selected as an inter-user interference signal. Descriptions are provided for how the CSI is estimated in this case.

In this respect, Beam Number 6 and Beam Number 12 may be spatially multiplexed and transmitted. For example, like in TM9 (Transmission Mode 9), the UE 30 may calculate an interference component by subtracting a CSI-RS (for example, Beam Number 6) addressed to UE 30 from the received signal. Alternatively or additionally, UE 30 may calculate the interference signal by performing channel estimation on Beam Number 12. In accordance with the present example, the below-given equation, EQ (1) may be used to determine an interference vector or component $\hat{I}$ in order to switch between different interference calculation methods.

$$\hat{I} = y - \hat{H}_{Beam\theta} x_{CSI-RS} \qquad \text{EQ (1)}$$

Furthermore, for example, Beam Number 6 and Beam Number 12 may be multiplexed as APs (Antenna Ports), RSs (Reference Signals) for which are different from each other. In other words, Beam 6 and Beam 12 may be multiplexed as APs 15, 16. To put it specifically, which AP represents the signal component, and which AP represents the interference component may be transmitted corresponding to configured CSI-RSs (MIB, SIB, RRC, MAC CE and/or DCI). In this respect, multiple desired signals and multiple interference signals may be configured. For example, APs 15, 16 may be transmitted as the desired signals, and APs 17, 18 may be transmitted as the interference signals. For example, APs 15, 16 may work as two 1-TxCSIs, or as a single 2-TxCSI. The interference may be treated and transmitted in the same manner as mentioned above. Furthermore, mutually-independent Quasi-collocation information may be configured with each AP.

The inter-cell interference may be estimated using a method of calculating a total interference power by adding up an estimated inter-user interference and a separately-estimated inter-cell interference, for example, using CSI-IM. In the above example, the interference may be estimated using a result of estimation of AP 16 and the separately-calculated inter-cell interference.

Meanwhile, there is likelihood that transmission of spatially multiplexed CSI-RSs (multiple streams) has smaller power per stream than transmission of a signal stream. The power difference (change) may be transmitted to the UE. Power of the CSI-RS may be implicitly calculated based on information on the number of multiplexed streams, and the like. In addition, the UE may calculate the CSI based on information associated with the power.

Next, the inter-cell interference is described. Descriptions are provided for the inter-cell interference which occurs when Beam Number 3 is transmitted from eNB 20B. For example, by using the same RE (Resource Element) as is used for Beam Numbers 6, 12 of eNB 20A, interference power may be measured in the single RE. In other words, like in TM9, the interference component may be calculated by subtracting the beam represented by Beam Number 6 from the received signal, or the interference signal may be calculated by performing the channel estimation on the beam represented by Beam Number 12.

The foregoing example is shown in which the UE transmits multiple beam indices. Nevertheless, in the actual data transmission, the eNB does not necessarily employ all the beams transmitted by the UE. In one conceivable operation, the UE feeds back BIs representing beams with good characteristics, and the eNB employs any of the beams.

In the present example, CSI feedback information differs depending on which beam (s) is assumed to be relevant among those of the BIs fed back by the UE. In the calculation of CSI feedback information, CSI may be calculated on the assumption that the eNB employs some of the beams represented by the BIs. The CSI may be calculated based on a single beam assumed among the fed-back beams. In this respect, the CSI may be calculated by using, as the single assumed beam, the beam with the best characteristic, for example. Furthermore, the eNB may transmit information on which beam is assumed for the CSI calculation, or information on any of the beam assumed for the CSI calculation. In this case, a conceivable method of reducing the amount of signaling information is that beams which can be designated by the eNB are limited in the selection information from the UE. Moreover, the eNB may transmit a fixed value indicating the information on which beam is assumed, or information on how many beams are assumed.

In techniques using multiple antennas, such as Massive MIMO, the narrowed beam widths lead by necessity to a drastic increase in the number of selectable beams. In other words, the number of combinations of a desired beam, a beam used for the simultaneously served user, and a beam used in another cell exponentially increases. In this situation, it is difficult to feedback CSIs for all the various combinations. For example, in a condition in which there are 100 precoder candidates for each of the three beams, the number of combinations amounts to 1,000,000 (=100³). In addition, the channel estimation on a large number of beams causes an increase in the signal processing load on a terminal (e.g., a UE).

With above considerations taken into account, the UE may discretely feed the reception qualities (reception strengths) of desired signals and interference signals back to the eNB. Based on the discretely fed-back information, the eNB may recalculate the CSI.

The fed-back information may include the following values. To begin with, in the case of a method of feeding back a reception level, the UE feeds back a value representing an anchor or baseline reception level, and a value representing a differential from the anchor or baseline reception level. This includes examples as follows. Example 1: the UE feeds back the reception level of a beam which achieves the largest gain, as well as a reception-level differential between such a beam and another beam. Example 2: the UE feeds back the reception level of a desired signal, as well as a reception-level differential between the desired signal and an interference signal. Other examples are possible.

Alternatively or additionally, the UE may feed back the reception qualities of desired signals, and the reception quality of the interference signals. For example, the UE may feed back the reception strengths of desired signals to which different beams are applied, and the reception strengths of interference signals to which different beams are applied. In addition, when the UE receives interference signals from different cells, the UE may feed back the reception strengths of the respective interference signals.

In addition, with regard to interference signals, the UE may feed back values or levels for the inter-user interference and the inter-cell interference separately, and jointly. Particularly with regard to interference components, the UE may generate a single feedback based on configured interference estimation resources.

Furthermore, feedback may be supplied such that: the eNB transmits ranks, beam indices, PMI, related CSI-RS configuration numbers, or the like applied to the calculation of signals from the eNB, inter-user interference signals and inter-cell interference signals; and the UE feeds back corresponding CSI to the eNB.

Meanwhile, reception strengths are usable for a method of easily measuring reception qualities. In the conventional system, the eNB transmits an RS sequence to a terminal, and the terminal estimates the channel quality based on a channel estimate value using the RS. For the purpose of simplifying this measurement, the UE may estimate and feed back the signal strength(s) of the RE(s) without the eNB transmitting the RS sequence to the UE. Particularly, the UE can select a beam desired for the UE based on the reception strength. For example, a system may be employed in which: only an RE position at which to transmit an RS (and related information) is transmitted to the UE; and the UE feeds back reception strength information concerning the RE. In this respect, the information to be fed back by the UE may be part or all of the reception strength information, or resource numbers of several resources which achieve the largest (smallest) reception strengths. Meanwhile, like the information on the CSI-IM configurations, information to be transmitted to the UE may include time intervals of measurement RE insertion, time offsets, and RE positions in sub-frames. For example, reception strength measurement resources may be transmitted to the UE using RE mapping in 1-Tx CSI-RSs. As another example, reception strength measurement resources may be transmitted to the UE using RE mapping in a 2/4/8/16-Tx CSI-RS.

Generally speaking, desired signals and interference signals are widely different from each other in the reception level (and the transmission quality). For example, when the qualities of desired signals and the qualities of interference signals are fed back, there is possibility that the efficiency for feeding back the qualities is enhanced by encoding the qualities of the desired signals and the qualities of the interference signals separately. For example, the qualities of the desired signals may be fed back using an anchor plus a differential, and the qualities of the interference signals may be similarly fed back using an anchor plus a differential. Depending on cases, interference signals may be separately encoded in order to measure different types of interference.

For the purpose of feeding back the channel qualities separately like this, the channel feedback may be configured into two or more groups. For example, the UE may separately encode and feed back the thus-configured sets of information.

With regard to information on an RE position, because resources for the reception quality measurement are multiplexed, rate matching or puncturing may be applied to the PDSCH.

The UE may feed back the information without being aware of whether the information is on the desired signals or on the interference signals. Alternatively or additionally, classification information on things such as whether the RE is related to a desired signal or an interference signal may be transmitted.

Although the one or more embodiments may be configured is as described above, one or more embodiments are possible, which are applicable to communication systems other than the MU-MIMO system and the SU-MIMO system. One or more embodiments may be further applicable to FDD (Frequency Division Duplex) and TDD (Time Division Duplex) implementations.

Whether the reference signal is beamformed or not may be transparent in accordance with the standards specification. From this observation, the term beam section means not only literally beam selection but as a RS resource selection, cell-selection, or port selection. Moreover, the sync signal or reference signal need not be beamformed.

The one or more embodiments described above can apply to the uplink and the downlink, and can apply to transmission and reception on the uplink, the downlink or both the uplink and the downlink.

The one or more embodiments may be described mainly based on LTE/LTE-A physical channels and signals. But the invention is not limited to this. One or more embodiments may apply to other channel and signal structure. One or more embodiments may apply to a new physical channels or signals, for example, new reference signal or synchronization signal for New Radio (NR), the fifth generation of the wireless standard.

The one or more embodiments may be mainly described with reference to a CSI acquisition scheme based on CSI-RS. Alternatively or additionally, other sync signal, reference signal, or physical channel/signals may be used. Still further, a reference signal for RRM measurement or beam measurement such as measurement RS (MRS), mobility RS (MRS) and beam RS (BRS) may be used.

The one or more embodiments are mainly described in terms of CSI acquisition. However, alternatively or additionally, one or more embodiments may apply to initial cell connection, handover cell (cell re-selection), and beam management.

It is further noted that the terms RB and subcarrier may be used interchangeably in the one or more embodiments. Also the terms subframe and symbol may be used interchangeably.

As described above, according to a radio communication system, a radio base station and a user equipment of the one or more embodiments, the transmission beam control in a system that implements a disclosed embodiment or embodiments can be achieved with lower feedback overhead.

In addition to the foregoing one or more embodiments, other embodiments which do not depart from the gist of the embodiments disclosed herein may be encompassed. The invention is explained herein in terms of the disclosure one or more embodiments, but the scope of the invention is not limited only to the disclosed one or more embodiments. The scope of the invention is limited, not by what is described in the specification, but by what is recited in the claims appended hereto. Accordingly, the invention is intended to cover all the modes, arrangements, configurations, embodiments and the like that fall within the meaning and scope of the claims and within the range of equivalency of the claims.

What is claimed is:

1. A user equipment comprising:
    a receiver that receives, from a base station:
        identification information of a plurality of reference signals to be transmitted using radio resource control (RRC) signaling; and
        the plurality of reference signals;
    a processor that selects at least two reference signals from the plurality of reference signals based on a reception characteristic of the plurality of reference signals and the identification information; and
    a transmitter that transmits, the base station, feedback information that indicates the at least two reference signals based on the identification information,
    wherein the receiver receives, from the base station, information that indicates whether the user equipment is configured with beam group, and
    wherein, if the user equipment is configured with the beam group based on the information, the processor selects at least one reference signal from the plurality of reference signals.

2. The user equipment of claim 1, wherein each of the plurality of reference signals is a channel state information-reference signal (CSI-RS).

3. A wireless communication system comprising:
    a user equipment; and
    a base station that transmits, to the user equipment;
        identification information of a plurality of reference signals to be transmitted using radio resource control (RRC) signaling; and
        the plurality of reference signals;
    wherein the user equipment selects at least two reference signals from the plurality of reference signals based on a reception characteristic of the plurality of reference signals and the identification information,
    wherein the user equipment transmits, to the base station, feedback information that indicates the at least two reference signals based on the identification information,
    wherein the user equipment receives, from the base station, information that indicates whether the user equipment is configured with beam group, and
    wherein, if the user equipment is configured with the beam group based on the information, the user equipment selects at least one reference signal from the plurality of reference signals.

4. The wireless communication system of claim 3, wherein each of the plurality of reference signals is a channel state information-reference signal (CSI-RS).

* * * * *